United States Patent Office 3,336,360
Patented Aug. 15, 1967

3,336,360
ACRYLYLOXYALKYL ESTERS OF POLY-CARBOXYLIC ACIDS
Dale R. Dill, Webster Groves, Mo., assignor to Monsanto Company, St. Louis, Mo., a corporation of Delaware
No Drawing. Filed Dec. 26, 1963, Ser. No. 333,748
9 Claims. (Cl. 260—475)

This invention relates to a new class of chemical compounds. More particularly, the invention relates to novel acrylyloxyalkyl esters of polycarboxylic acids. These compounds have been found to be useful as polymerizable and permanent plasticizers.

The novel acrylyloxyalkyl esters are selected from the group consisting of those having the formulae:

$$R\begin{cases}C-O-(C_nH_{2n})-O-C-C-C=CH_2 \\ \phantom{C-O-}\|\phantom{(C_nH_{2n})-O-}\|\phantom{-}|\phantom{C=CH_2}\\ \phantom{C-O-(C_nH_{2n})-O-}O\phantom{-C-C=CH_2}(CH_2)_aH\\ C-O-(R_1-C-O-)_xR_2\\ \|\phantom{O-(}\|\\ O\phantom{-O(R_1-}O\end{cases}$$

and $$CH_2=C-C-O-(C_nH_{2n})-O-C-R'=\left[C-O-(R_1-C-O-)_xR_2\right]_2$$
$$\phantom{CH_2=}|\phantom{C-O-(C_nH_{2n})-O-}\|\phantom{-R'=}\|\phantom{-O-(R_1-}\|$$
$$\phantom{CH_2=}(CH_2)_aH\phantom{-O-(C_nH_{2n})-O-}O\phantom{-R'=}O\phantom{-O-(R_1-}O$$

and $$R''\begin{cases}\left[C-O-(C_nH_{2n})-O-C-C=CH_2\right]_2\\ \phantom{[}\|\phantom{-O-(C_nH_{2n})-O-}\|\phantom{-}|\\ \phantom{[}O\phantom{-O-(C_nH_{2n})-O-}O\phantom{-}(CH_2)_aH\\ \left[C-O-(R_1-C-O-)_xR_2\right]_2\\ \phantom{[}\|\phantom{-O-(R_1-}\|\\ \phantom{[}O\phantom{-O-(R_1-}O\end{cases}$$

wherein:

R is a member of the group consisting of phenylene, alkyl substituted phenylene of 7–16 carbon atoms, halophenylene, nitrophenylene, cyclohexenylene, naphthylene, ethylene, trimethylene, alkyl substituted ethylene of 3 to 12 carbon atoms, alkenyl substituted ethylene of 7 to 14 carbon atoms, vinylene, chlorovinylene, bromovinylene, 1-isopropenylene and 3-isopropenylene;

R' is a member of the group consisting of phenenyl and 1-propen-1,2,3-yl;

R'' is benzenetetrayl;

$R_1$ is a divalent aliphatic hydrocarbon radical containing from 1 to 4 carbon atoms;

$R_2$ is a radical selected from the group consisting of alkyl, aralkyl and aryl having 1 to 20 carbon atoms;

$x$ is an integer from zero to 1;

$a$ is an integer from zero to 1; and $n$ is an integer from 2 to 10.

It is a primary object of this invention to provide novel acrylyloxyalkyl esters of polycarboxylic acids.

A further object is to provide a novel class of acrylyloxyalkyl esters of polycarboxylic acids which are useful as polymerizable and permanent plasticizers.

Other and different objects, features and advantages of this invention will become apparent to those skilled in the art upon consideration of the following detailed description thereof and the examples attendant thereto.

It has been found that the heretofore described acryloxyalkyl esters of polycarboxylic acids can be readily prepared by heating at a temperature of from about 50° C. to about 200° C. in equimolar quantities a polycarboxylic acid anhydride, a hydroxyalkyl acrylate, a tertiary amine, and an alkyl halide, an aralkyl halide or an aliphatic, cycloaliphatic or aryl ester of a lower haloalkanoic acid.

The hydroxyalkyl acrylates which can be used in preparing the novel compounds of this invention can be represented by the formula, $$CH_2=C-C-O-(C_2H_{2n})-OH$$
$$\phantom{CH_2=}|\phantom{-}\|$$
$$\phantom{CH_2=}(CH_2)_aH\phantom{O}$$
$$\phantom{CH_2=C-}O$$

wherein:

$a$ is an integer from zero to 1; and $n$ is an integer from 2 to 10.

Illustrative hydroxyalkyl acrylates suitable for use in the preparation of the novel compounds of this invention include 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, 6-hydroxyhexyl methacrylate, 8-hydroxyoctyl methacrylate, 10-hydroxydecyl methacrylate, 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 6-hydroxyhexyl acrylate, 8-hydroxyoctyl arcylate and 10-hydroxydecyl acrylate.

The polycarboxylic acid anhydrides useful in the preparation of the novel compounds of this invention include succinic anhydride, substituted succinic anhydrides such as propylsuccinic anhydride, methylbutylsuccinic anhydride, hexylsuccinic anhydride, heptylsuccinic anhydride, tertapropenylsuccinic anhydride, pentenylsuccinic anhydride, octenylsuccinic anhydride, nonenylsuccinic anhydride, α,β-diethylsuccinic anhydride and the like; glutaric anhydride; maleic anhydride; substituted maleic anhydrides such as chloromaleic anhydride and dischloromaleic anhydride; itaconic anhydride, citraconic anhydride; aconitic anhydride; tetrahydrophthalic anhydride, trimellitic anhydride; pyromellitic anhydride; phthalic anhydride; methyltetrahydrophthalic anhydride; hexa- chloroendomethylenetetrahydrophthalic anhydride, tetrabromophthalic anhydride, tetraiodophthalic anhydride, substituted phthalic anhydrides such as tetrachlorophthalic anhydride, 4-nitrophthalic anhydride, methylphthalic anhydride, ethylphthalic anhydride, propylphthalic anhydride, butylphthalic anhydride; naphthalic anhydrides such as 1,2-naphthalic anhydride, 1,8-naphthalic anhydride, 2,3-naphthalic anhydrides; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in the preparation of polymerizable compositions, include the Diels-adler adducts of maleic acid and aliphatic compounds having conjugated double bonds.

Tertiary amines suitable for use in preparing the compounds of this invention can be represented by the formula, $$R_3-\underset{\underset{R_2}{|}}{\overset{\overset{R_1}{|}}{N}}-R_2$$

wherein:

$R_1$, $R_2$ and $R_3$ are like or unlike saturated aliphatic organic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylethanolamine, dimethylcyclohexylamine, dimethylhexylamine, diethylhexylamine, dimethyldecylamine and the like.

The alkyl halide reactant of this invention can be represented by YX, where Y is a straight or branched chain alkyl radical containing up to 20 carbon atoms and X is a halogen atom, such as chlorine, bromine and iodine atoms, with a preference in that order. It is preferred that YX be an alkyl halide containing 4 to 20 carbon atoms.

An illustrative of the preferred alkyl halide reactants of this invention are n-butyl chloride, n-butyl bromide, sec.-butyl chloride, n-amyl chloride, isoamyl chloride, sec.-amyl chloride, sec.-amyl iodide, n-amyl bromide, n-hexyl chloride, isohexyl chloride, sec.-hexyl chloride, 2-chlorohexane, n-heptyl chloride, isoheptyl chloride, 2-chloroheptane, n-octyl chloride, n-octyl bromide, n-octyl iodide, isooctyl chloride, 2-chlorooctane, 4-chlorooctane, 2-ethylhexyl chloride, 2-chlorononane, 3-chlorononane, 2-chlorodecane, n-decyl chloride, 3-chlorodecane, undecyl chloride, 2-chloroundecane, n-dodecyl chloride, n-dodecyl bromide, 2-chlorododecane, 2-bromododecane, 3-chlorododecane, tridecyl chloride, tetradecyl chloride, pentadecyl chloride, hexadecyl chloride, octadecyl chloride, octadecyl bromide, eicosyl chloride, and the various isomers thereof and various mixtures thereof, as, for example, those obtained upon monochlorinating alkane fractions obtained from petroleum. Particularly suitable alkanes are those obtained from petroleum fractions boiling at atmospheric pressure in the range of about 30° C. to about 300° C., such as pentane cut from gasoline boiling from about 30° C. to about 40° C., a ligroin boiling from about 90° C. to about 120° C., a benzine boiling from about 120° C. to about 150° C., and a kerosene boiling from about 150° C. to about 235° C.

The aralkyl halides which can be used in the process of this invention are benzyl chloride, benzyl bromide and benzyl iodide as well as the alkyl substituted benzyl halides, e.g. methyl benzyl chloride, methyl benzyl bromide, ethyl benzyl chloride, dimethyl benzyl chloride and the like, the alkoxy substituted benzyl halides, e.g. methoxy benzyl chloride, ethoxy benzyl chloride, dimethoxybenzyl bromide, and the halogen substituted benzyl halides, e.g. chlorobenzyl chloride, chlorobenzyl iodide, dichlorobenzyl bromide, dichlorobenzyl chloride, trichlorobenzyl chloride, bromobenzyl chloride, bromobenzyl bromide, dibromobenzyl chloride, iodobenzyl chloride, and the like.

Aliphatic, cycloaliphatic and aryl esters of lower haloalkanoic acids which can be used in the process of the invention can be prepared from chloroacetic, iodoacetic, 3-chloropropionic, bromoacetic, 4-chlorobutyric acid and the like.

The invention will be more readily understood by reference to the following examples which describe the detailed preparation of representative compounds. There are, of course, many other forms of this invention which will become obvious to one skilled in the art once the invention has been fully disclosed, and it will accordingly be recognized that these examples are given for the purpose of illustration only, and are not to be construed as limiting the scope of this invention in any way.

*Example I*

To a suitable reaction vessel having means for the addition and removal of heat, means for measuring the temperature of the reaction mass, means for agitating the reaction mass, means for the addition and removal of solids and liquids and fitted with a condenser, there is charged 148.1 grams (1.0 mole) of phthalic anhydride and 132.0 grams (1.015 mole) of 2-hydroxyethyl methacrylate. The mixture is heated to about 110° C. and 107 grams (1.06 mole) of triethylamine is added. There is then added 124.0 grams (0.98 mole) of benzyl chloride. The resultant reaction mixture is held at a temperature of about 120° C. for about one hour and then washed with several water and lye washes at about 80–85° C. The oil layer from the washing step is steam sparged and dehydrated at 110–120° C./15 mm. of Hg. There is obtained 316.0 grams of methacrylyloxyethyl benzyl phthalate.

*Examples II–VII*

Following the procedure of Example I, 1.0 mole of each of the anhydrides tabulated below is substituted for the phthalic anhydride. The product obtained in each instance is as indicated.

II.

anhydride=tetrapropenyl succinic anhydride
product=methacrylyloxyethyl benzyl tetrapropenyl succinate

III.

anhydride=chloromaleic anhydride
product=methacrylyloxyethyl benzyl chloromaleate

IV.

anhydride=citraconic anhydride
product=methacrylyloxyethyl benzyl citraconate

V.

anhydride=chlorophthalic anhydride
product=methacrylyloxyethyl benzyl chlorophthalate

VI.

anhydride=nitrophthalic anhydride
product=methacrylyloxyethyl benzyl nitrophthalate

VII.

anhydride=1,8-naphthalic anhydride
product=methacrylyloxyethyl benzyl 1,8-naphthalate

*Example VIII*

A suitable reaction vessel is charged with 100.1 grams (1.0 mole) of succinic anhydride and 132.0 grams (1.015 moles) of 2-hydroxyethyl methacrylate. The reaction mixture is heated to about 100° C. over a period of about thirty minutes. There is then added 107 grams (1.06 moles) of triethylamine. Upon completion of the addition of the triethylamine to the mixture, 124 grams (0.98 mole) of benzyl chloride is added. The temperature of the reaction mixture is then maintained at about 105–120° C. for an additional hour to ensure completion of the reaction. The resultant reaction mixture is quenched with 500 ml. of water and washed several times with water and lye washes at 85° C. The reaction mixture is then steam sparged and dehydrated under vacuum. There is obtained 185.0 grams of methacrylyloxyethyl benzyl succinate.

*Example IX*

Following the procedure of Example VIII, 114.10 grams (1.0 mole) of glutaric anhydride, 136.0 grams (1.02 moles) of 2-hydroxyethyl methacrylate, 106.0 grams (1.05 moles) of triethylamine, and 326.0 grams (0.98 mole) of octadecyl bromide are utilized to prepare methacrylyloxyethyl octadecyl glutarate in good yield.

*Example X*

Following the procedure of Example VIII, 98.06 grams (1.0 mole) of maleic anhydride, 136.0 grams (1.02 moles) of 2-hydroxyethyl methacrylate, 106.0 grams (1.05 moles) of triethylamine and 373.0 grams (0.98 mole) of octadecyliodide are utilized to prepare methacrylyloxyethyl octadecyl maleate in high yield.

*Example XI*

Following the procedure of Example VIII, 112.08 grams (1.0 mole) of itaconic anhydride, 136.0 grams (1.02 moles) of 2-hydroxyethyl methacrylate, 106.0 grams (1.05 moles) of triethylamine, and 138.0 grams (0.98 mole) of methylbenzyl chloride are utilized to prepare methylacrylyloxyethyl methylbenzyl itaconate in good yield.

Example XII

Following the procedure in Example VIII, 162.15 grams (1.0 mole) of methyl phthalic anhydride, 136.0 grams (1.02 moles) of 2-hydroxyethyl methacrylate, 106.0 grams (1.05 moles) of triethylamine and 161.0 grams (0.98 mole) of butyl 3-chloropropionate are utilized to prepare methacrylyloxyethyl 3-(butoxycarbonyl) propyl methylphthalate in good yield.

Example XIII

A suitable reaction vessel is charged with 89.0 grams (0.6 mole) of phthalic anhydride and 79.5 grams (0.62 mole) of 2-hydroxyethyl methacrylate. The mixture is heated to a temperature of about 100–110° C. There is then added 64.5 grams (0.63 mole) of triethylamine. After the addition of the triethylamine is completed, 121 grams (0.98 mole) of 2-ethylhexyl α-chloroacetate is added to the reaction mixture. The resulting mixture is held at a temperature of about 130° C. for about one hour and then washed with several lye and water washes at about 85–90° C. The reaction mixture is steam sparged and dehydrated under vacuum. There is obtained 238.6 grams of methacrylyloxyethyl 2-ethylhexoxycarbonylmethylene phthalate ($n_D^{25}$ 1.4920).

Example XIV

Following the procedure of Example XIII, 156.09 grams (1.0 mole) of aconitic anhydride, 136.0 grams (1.02 moles) of 2-hydroxyethyl methacrylate, 212.0 grams (2.10 moles) of triethylamine and 248.0 grams (1.96 moles) of benzyl chloride are utilized to prepare methacrylyloxyethyl dibenzyl aconitate in good yield.

Example XV

In the procedure of Example XIII, 167.0 grams (0.98 mole) of phenyl α-chloroacetate is substituted for the 2-ethylhexyl α-chloroacetate. There is obtained methacrylyloxy phenoxycarbonylmethylene phthalate in good yield.

Example XVI

A suitable reaction vessel is charged with 98.06 grams (1.0 mole) of maleic anhydride, 136.0 grams (1.02 moles) of 2-hydroxyethyl methacrylate and 2 ml. thionyl chloride. After the mixture has been allowed to react for about 1 hour, 106.0 grams (1.05 moles) of triethylamine and 124.0 grams (0.98 mole) of benzyl chloride are added. The reaction mixture is worked up in the manner described above and there is obtained methacrylyloxyethyl benzyl fumarate in high yield.

Example XVII

Following the procedure of Example XIII, 152.15 grams (1.0 mole) of tetrahydrophthalic anhydride, 136.0 grams (1.02 moles) of 2-hydroxyethyl methacrylate, 106.0 grams (1.05 moles) of triethylamine and 153.5 grams (0.98 mole) of methoxybenzyl chloride are utilized to prepare methacrylyloxyethyl methoxybenzyl tetrahydrophthalate in excellent yield.

Example XVIII

Following the procedure of Example VIII, 192.13 grams (1.0 mole) of trimellitic anhydride, 136.0 grams (1.02 moles) of 2-hydroxyethyl methacrylate, 212.0 grams (2.10 moles) of triethylamine and 248.0 grams (1.96 moles) of benzyl chloride are utilized to prepare methacrylyloxyethyl dibenzyl trimellitate in excellent yield.

Example XIX

Following the procedure of Example VIII, 218.12 grams (1.0 mole) of pyromellitic anhydride, 272.0 grams (2.04 moles) of 2-hydroxyethyl methacrylate, 212.0 grams (2.10 moles) of triethylamine and 248.0 grams (1.96 moles) of benzyl chloride are utilized to prepare dimethacrylyloxyethyl dibenzyl pyromellitate in good yield.

Example XX

Following the procedure of Example I, 1.015 moles of 2-hydroxyethyl acrylate is substituted for the 2-hydroxyethyl methacrylate to prepare acrylyloxyethyl benzyl phthalate in excellent yield.

Example XXI

A suitable reaction vessel is charged with 148.1 grams (1.0 mole) of phthalic anhydride and 132.0 grams (1.015 moles) of 2-hydroxyethyl methacrylate. The resultant mixture is heated to about 100° C. for about 15 minutes. There is then added 107 grams (1.06 moles) of triethylamine. After the addition of the triethylamine, 238.0 grams (1.07 moles) of 1-bromodecane is added. The reaction mixture is held at a temperature of about 135° C. for about one hour and then washed with several lye and water washes. Thereafter, the oil layer from the washing step is steam sparged and dehydrated at 110° C./15 mm. of Hg. There is obtained 410 grams of methacrylyloxyethyl decyl phthalate.

Examples XXII–XXV

Following the procedure of Example I, 1.015 moles of hydroxyalkyl acrylate and 0.98 mole of alkyl halide are substituted as tabulated below for the like constituents in Example I. The product obtained in each instance is as indicated.

XXII hydroxyalkyl acrylate=2-hydroxypropyl acrylate
alkyl halide=butyl chloride
product=acrylyloxy-2-propyl butyl phthalate

XXIII hydroxyalkyl acrylate=2-hydroxybutyl acrylate
alkyl halide=butyl bromide
product=acrylyloxy-2-butyl butyl phthalate

XXIV hydroxyalkyl methacrylate=2 hydroxypropyl methacrylate
alkyl halide=octadecyl bromide
product=methacrylyloxy-2-propyl octadecyl phthalate

XXV hydroxyalkyl methacrylate=2-hydroxybutyl methacrylate
alkyl halide=allyl bromide
product=methacrylyloxy-2-butyl allyl phthalate As previously stated, the products of this invention are useful as polymerizable and permanent plasticizers. The advantageous properties possessed by the esters of this invention will be more fully understood by reference to the following examples.

The following testing procedures are used in evaluating the physical properties of plasticizers.

Heat distortion—A.S.T.M. 1043–51
Volatility—A.S.T.M. D–1203
Tensile properties—A.S.T.M. D–882–56T
Hardness—A.S.T.M. D–676–58T Toughness is defined as the area under the stress-strain curve obtained in test procedure A.S.T.M. D–882–56T.

Example XXVI

Sixty parts of methacrylyloxyethyl benzyl phthalate is incorporated with 100 parts of polyvinyl chloride and the resulting resinous composition is pressure molded for 12 minutes at 160° C. There is obtained a hard and rigid plasticized material having a shore hardness of 75, a heat distortion temperature of 36° C., a volatility value of 0.39%, a tensile strength of 4100 p.s.i., a toughness value of 3095 pounds per square inch and an elongation value of 205%.

Examples XXVII–XXIX

The plasticizer in Example XXIV was replaced with 60 parts of the following plasticizers:

XXVII methacrylyloxyethyl decyl phthalate

XXVIII methacrylyloxyethyl benzyl succinate

XXIX methacrylyloxyethyl 2-ethylhexylglycolyl phthalate

The plasticized resins are hard and rigid. The physical properties obtained with the above compositions are tabulated as follows:

|  | Example | | |
|---|---|---|---|
|  | XXVII | XXVIII | XXIX |
| Hardness | 42 | 63 | 53 |
| Volatility, percent | 1.29 | 1.87 | 1.0 |
| Tensile Strength, p.s.i. | 2270 | 2550 | 5790 |
| Toughness, pounds per square inch | 3,080 | 2,830 | 3,920 |
| Elongation, percent | 455 | 300 | -------- |

Other compounds within the scope of this invention are found to possess properties of a similar nature.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A compound selected from the group consisting of those having the formulae:

$$\begin{array}{c} O \quad\quad\quad O \;\; (CH_2)_aH \\ \| \quad\quad\quad \| \quad\quad | \\ C-O-(C_nH_{2n})-O-C-C=CH_2 \\ R \Big/ \\ \phantom{R}\Big\backslash C-O-(R_1-C-O-)_xR_2 \\ \| \quad\quad\quad\quad \| \\ O \quad\quad\quad\quad O \end{array}$$

and $$CH_2=\overset{(CH_2)_aH}{\underset{\underset{O}{\|}}{\overset{|}{C}}-C}-O-(C_nH_{2n})-O-\overset{O}{\underset{\|}{C}}-R'=\left[\overset{O}{\underset{\|}{C}}-O-(R_1-\overset{O}{\underset{\|}{C}}-O-)_xR_2\right]_2$$

and $$\left[\overset{O}{\underset{\|}{C}}-O(C_nH_{2n})-O-\overset{O}{\underset{\|}{C}}-\overset{(CH_2)_aH}{\underset{|}{C}}=CH_2\right]_2$$
$$R''{\Big\backslash}\left[\overset{O}{\underset{\|}{C}}-O-(R_1-\overset{O}{\underset{\|}{C}}-O-)_xR_2\right]_2$$

wherein:
R is a member of the group consisting of phenylene, alkyl substituted phenylene of 7–16 carbon atoms, halophenylene, nitrophenylene, cyclohexenylene, naphthylene, ethylene, trimethylene, alkyl substituted ethylene of 3 to 12 carbon atoms, alkenyl substituted ethylene of 7 to 14 carbon atoms, vinylene, chlorovinylene, bromovinylene, 1-isopropenylene and 3-isopropenylene;
R' is a member of the group consisting of phenenyl and 1-propen-1,2,3-yl;
R'' is benzenetetrayl;
$R_1$ is a divalent aliphatic hydrocarbon radical containing from 1 to 4 carbon atoms;
$R_2$ is a radical selected from the group consisting of alkyl, aralkyl and aryl having 1 to 20 carbon atoms;
$x$ is an integer from zero to 1;
$a$ is an integer from zero to 1; and
$n$ is an integer from 2 to 10.

2. A compound of the formula, $$\begin{array}{c} O \quad\quad\quad O \;\; (CH_2)_aH \\ \| \quad\quad\quad \| \quad\quad | \\ C-O-(C_nH_{2n})-O-C-C=CH_2 \\ R \Big/ \\ \phantom{R}\Big\backslash C-O-(R_1-C-O-)_xR_2 \\ \| \quad\quad\quad\quad \| \\ O \quad\quad\quad\quad O \end{array}$$

wherein:
R is a member of the group consisting of phenylene, alkyl substituted phenylene of 7–16 carbon atoms, halophenylene, nitrophenylene, cyclohexenylene, naphthylene, ethylene, trimethylene, alkyl substituted ethylene of 3 to 12 carbon atoms, alkenyl substituted ethylene of 7 to 14 carbon atoms, vinylene, chlorovinylene, bromovinylene, 1-isopropenylene and 3-isopropenylene;
$R_1$ is a divalent aliphatic hydrocarbon radical containing from 1 to 4 carbon atoms;
$R_2$ is a radical selected from the group consisting of alkyl, aralkyl and aryl having 1 to 20 carbon atoms;
$x$ is an integer from zero to 1;
$a$ is an integer from zero to 1; and
$n$ is an integer of 2 to 10.

3. A compound of the formula, $$CH_2=\overset{(CH_2)_aH}{\underset{\underset{O}{\|}}{\overset{|}{C}}-C}-O-(C_nH_{2n})-O-\overset{O}{\underset{\|}{C}}-R'=\left[\overset{O}{\underset{\|}{C}}-O-(R_1-\overset{O}{\underset{\|}{C}}-O-)_xR_2\right]_2$$

wherein:
R' is a member of the group consisting of phenenyl and 1-propen-1,2,3-yl;
$R_1$ is a divalent aliphatic hydrocarbon radical containing from 1 to 4 carbon atoms;
$R_2$ is a radical selected from the group consisting of alkyl, aralkyl and aryl having 1 to 20 carbon atoms;
$x$ is an integer from zero to 1;
$a$ is an integer from zero to 1; and
$n$ is an integer of 2 to 10.

4. A compound of the formula, $$\left[\overset{O}{\underset{\|}{C}}-O(C_nH_{2n})-O-\overset{O}{\underset{\|}{C}}-\overset{(CH_2)_aH}{\underset{|}{C}}=CH_2\right]_2$$
$$R''{\Big\backslash}\left[\overset{O}{\underset{\|}{C}}-O-(R_1-\overset{O}{\underset{\|}{C}}-O-)_xR_2\right]_2$$

wherein:
R'' is benzenetetrayl;
$R_1$ is a divalent aliphatic hydrocarbon radical containing from 1 to 4 carbon atoms;
$R_2$ is a radical selected from the group consisting of alkyl, aralkyl and aryl having 1 to 20 carbon atoms;
$x$ is an integer from zero to 1;
$a$ is an integer from zero to 1; and
$n$ is an integer of 2 to 10.

5. Methacrylyloxyethyl decyl phthalate.
6. Methacrylyloxyethyl benzyl succinate.
7. Methacrylyloxyethyl benzyl phthalate.
8. Methacrylyloxyethyl 2-ethylhexoxycarbonylmethylene phthalate.
9. Acrylyloxyethyl benzyl phthalate.

References Cited

UNITED STATES PATENTS 2,612,491   9/1952   Evans et al. _____ 260—485

LORRAINE A. WEINBERGER, *Primary Examiner.*

T. L. GALLOWAY, *Assistant Examiner.*